(12) United States Patent
Korpanty et al.

(10) Patent No.: US 6,467,751 B1
(45) Date of Patent: Oct. 22, 2002

(54) INFLATION VALVE

(75) Inventors: Daniel Korpanty, Clarence; Gary Thomasulo, Eden; Christopher Lanza, Cheektowaga; Oliver Berry, Holland, all of NY (US)

(73) Assignee: Carleton Technologies, Inc., Orchard Park, NY (US)

( * ) Notice: Subject to any disclaimer, the term of this patent is extended or adjusted under 35 U.S.C. 154(b) by 0 days.

(21) Appl. No.: 09/448,997

(22) Filed: Nov. 24, 1999

(51) Int. Cl.$^7$ ............................................. F16K 35/00
(52) U.S. Cl. ..................... 251/90; 251/294; 251/297; 251/324
(58) Field of Search ................... 251/294, 297, 251/89, 90, 324; 137/495, 496, 224

(56) References Cited

U.S. PATENT DOCUMENTS

| | | | | |
|---|---|---|---|---|
| 184,279 A | * | 11/1876 | Chamberlain | ................ 137/495 |
| 232,008 A | * | 9/1880 | Demarest | ..................... 137/495 |
| 1,320,441 A | * | 11/1919 | Baillie | ..................... 251/294 X |
| 1,771,122 A | * | 7/1930 | Jay | ......................... 251/294 X |
| 2,749,941 A | * | 6/1956 | Gardner | .................. 251/297 X |
| 2,884,954 A | * | 5/1959 | Roberts | ................... 251/294 X |
| 3,023,773 A | * | 3/1962 | Hasbany | ..................... 137/495 |
| 3,308,850 A | | 3/1967 | Gill | |
| 3,559,689 A | * | 2/1971 | Dunbar | .................... 251/294 X |
| 3,570,805 A | | 3/1971 | Moran et al. | |
| 3,602,245 A | * | 8/1971 | Meisel | ..................... 251/297 X |
| 3,702,623 A | * | 11/1972 | Chacko | ..................... 137/495 |
| 3,790,129 A | * | 2/1974 | Pauls | ........................ 251/297 |
| 3,802,012 A | * | 4/1974 | Middleton, Jr. | ............. 137/525 |
| 3,807,441 A | * | 4/1974 | Grosseau | .................... 137/495 |
| 3,860,984 A | | 1/1975 | Fisher | |
| 4,061,158 A | * | 12/1977 | Musial | .................... 251/294 X |
| 4,168,720 A | | 9/1979 | Raskin | |
| 4,215,715 A | | 8/1980 | Raskin | |
| 4,549,870 A | | 10/1985 | Wass | |
| 4,566,862 A | | 1/1986 | Halavais | |
| 4,595,374 A | * | 6/1986 | Wass | ....................... 251/324 X |
| 4,633,957 A | * | 1/1987 | Prost | ....................... 251/297 X |
| 4,757,840 A | * | 7/1988 | Chmelar | ................. 251/297 X |
| 4,794,950 A | * | 1/1989 | Gratzmuller | ............ 251/297 X |
| 4,860,788 A | * | 8/1989 | Asaoka | .................... 137/495 X |
| 4,946,130 A | * | 8/1990 | Kooiman | ................. 251/297 X |
| 4,959,034 A | * | 9/1990 | Wass | ........................... 441/41 |
| 5,009,249 A | | 4/1991 | Fisher et al. | |
| 5,113,891 A | * | 5/1992 | Carney | .................... 251/297 X |
| 5,131,427 A | * | 7/1992 | Latza | ...................... 137/495 X |
| 5,169,119 A | | 12/1992 | Duggal et al. | |
| 5,190,074 A | * | 3/1993 | Christopher | ................. 137/495 |
| 5,205,538 A | * | 4/1993 | Mackoway, Jr. et al. | ... 251/297 |
| 5,360,186 A | | 11/1994 | Danielson et al. | |
| 5,375,625 A | * | 12/1994 | Reynolds | ................... 251/89 X |
| 5,711,757 A | * | 1/1998 | Bryant | .................... 251/294 X |
| 5,738,305 A | | 4/1998 | Pruitt | |

* cited by examiner

Primary Examiner—Lesley D. Morris
Assistant Examiner—John Bastianelli
(74) Attorney, Agent, or Firm—Jaeckle Fleischmann & Mugel, LLP

(57) ABSTRACT

An inflation valve has a valve housing having an inner wall, a cylindrical inner chamber terminating in a gas outlet, and a gas inlet bore providing fluid communication between the inner chamber and a pressurized gas source. A piston enclosed in the inner chamber has at one end a head directed toward the gas outlet and at the opposite end a valve actuator connector. The piston further has a gas inlet seal, positioned between the head and the actuator connector, that releasably seals the gas inlet bore from the inner chamber when the piston is in a normal, non-actuated position. A valve actuator connected to the actuator connector operates to pull the piston, thereby moving the gas inlet seal away from the gas inlet bore and putting the inner chamber in fluid communication with the gas inlet bore and pressurized gas source. A regulating spring contacting the piston close to the actuator connector is compressible by the force of pressure exerted by gas contained within the inner chamber and the gas inlet bore and operates to position the piston to control or regulate the outlet pressure.

10 Claims, 4 Drawing Sheets

INFLATION VALVE

FIELD OF THE INVENTION

The present invention relates to valves and, more particularly, to an inflation valve for controlling the flow of pressurized gas in the inflation of inflatable devices such as aircraft emergency evacuation slides and rafts.

BACKGROUND OF THE INVENTION

Inflation valves find extensive use in controlling the flow of a stored pressurized gas to a variety of inflatable devices such as emergency evacuation slides for aircraft, life rafts, crash bags, and the like. For example, U.S. Pat. No. 5,009,249 to Fisher et al. discloses a pressure regulator for regulating an inflatable member such as a slide. The pressure regulator includes a spool valve balanced between a trigger mechanism on one end and a spring on the other. Actuating the trigger mechanism on one end causes the spool valve to be unseated by a first spring and thereby placed in a pressure regulating position by a second spring in opposition to the escaping fluid pressure acting on the valve. The first spring biases the spoon valve to interconnect the outlet with the gas storage, and the second spring regulates the gas flow from storage to outlet in response to pressure change at the outlet.

Similarly, U.S. Pat. No. 4,549,870 to Wass discloses a raft inflation valve having a pin that provides a stop at one end of a spool valve and a spring at the other. Removing the pin allows the spring to urge the spool valve into an open position, thereby enabling inflation of the raft.

SUMMARY OF THE INVENTION

In accordance with the present invention, an inflation valve comprises a valve housing having an inner wall, a cylindrical inner chamber terminating in a gas outlet, and a gas inlet bore providing fluid communication between the inner chamber and a pressurized gas source. A piston enclosed in the inner chamber comprises at one end a head directed toward the gas outlet and at the opposite end a valve actuator connector. The piston further comprises a gas inlet seal, positioned between the head and the actuator connector, that releasably seals the gas inlet bore from the inner chamber when the piston is in a normal non-actuated position. A valve actuator connected to the actuator connector operates to pull the piston, thereby moving the gas inlet seal away from the gas inlet bore and putting the inner chamber in fluid communication with the gas inlet bore and pressurized gas source. A regulating spring disposed within the inner chamber close to the actuator connector is compressible by the force of pressure exerted by gas contained within the inner chamber and gas inlet bore and operates to position the piston to control or regulate the outlet pressure, returning the piston toward its normal non-actuated position as the gas in the inner chamber exits via the gas outlet.

DETAILED DESCRIPTION OF THE INVENTION

Figure 1A:
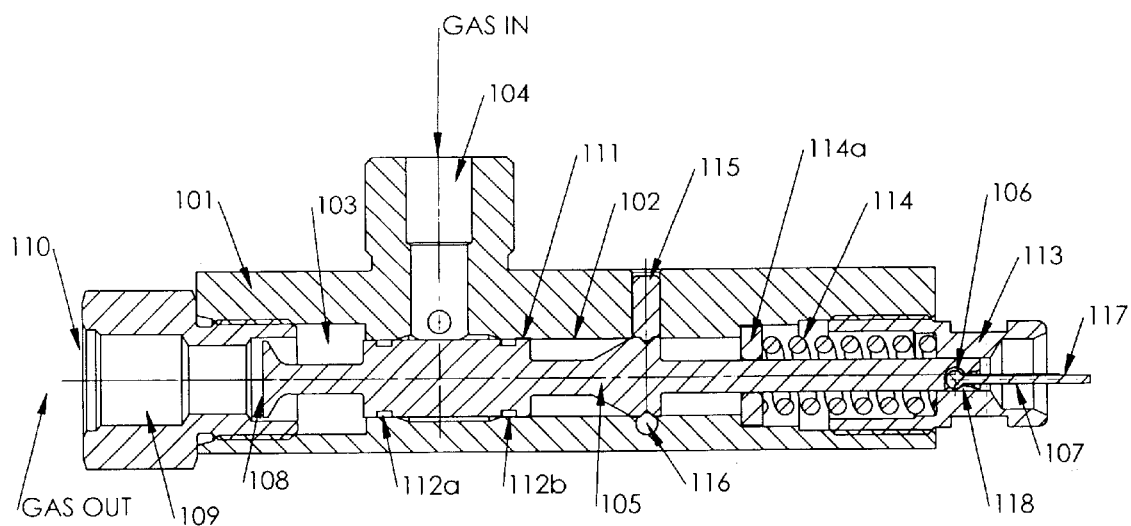
FIGS. 1A adn 1B are cross-sectional views of a valve of the invention in, respectively, its non-actuated and actuated positions.
Figure 1B:
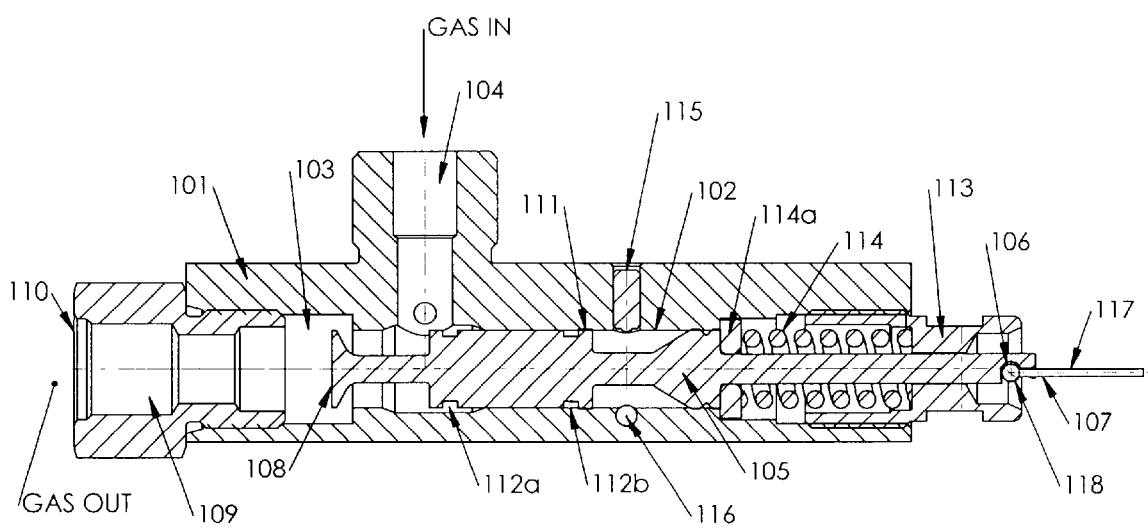

As shown in FIGS. 1A and 1B, an inflation valve 100 of the present invention includes a valve housing 101 having an inner wall 102 and a cylindrical chamber 103. A gas inlet bore 104 leading from a compressed gas source (not shown) intersects inner chamber 103. A piston 105 is enclosed by inner wall 102 of valve housing 101. Piston 105 includes at one end an actuator connector 106, to which is attached a valve actuator 107. At the other end of the piston 105 is a piston head 108 that engages with an outlet bore 109 at a gas outlet 110 that is disposed at one end of valve housing 101. Gas outlet 110 is connected to an inflatable device such as an aircraft emergency slide (not shown).

Piston 105 is also provided with a gas inlet seal land 111 positioned between actuator connector 106 and piston head 108 and equipped with two O-ring seals 112a and 112b. If desired, O-ring seal 112a can be mounted at a corresponding position on piston 105 rather than on inner wall 102. When piston 105 is in its normal non-actuated position, gas seal land 111 and O-ring seals 112a and 112b prevent the flow of gas from gas inlet bore 104 to inner chamber 103. Operation of valve actuator 107 by pulling causes piston 105 to move within inner wall 102 of housing 101, unsealing gas inlet bore 104 and allowing gas to flow into the inner chamber 103 and thence to outlet 110.

The end of valve housing 101 opposite gas outlet 110 is closed by an actuator housing 113 that guides valve actuator 107. Regulating spring 114 connects actuator housing 113 and the end of piston 105 nearest actuator 107. When gas is discharged into inner chamber 103 by operation of actuator 107 to move piston 105, spring 114 is compressed. The force of the pressure on piston 105, which diminishes as the discharged gas exits outlet 110, is counteracted by a substantially equal opposing force from compressed spring 114, causing piston 105 to return towards its original non-actuated position as the gas pressure at inlet bore 104 is reduced.

To provide against inadvertent actuation, inflation valve 100 can be provided with a safety lock mechanism that includes a detent 115 and a safety release pin 116. Before valve actuator 107 can be operated, pin 116 must be removed, which allows piston 105 to move within housing 101.

As also shown in FIGS. 1A and 1B, valve actuator 107 can comprise a cable or rod 117 terminated by a ball 118, and actuator connector 106 can be a socket for retaining ball 118. The term "pulling" as applied to operating valve actuator 107 is employed to describe the mechanical moving of piston 105 toward actuator housing 113 and away from gas outlet 110. Conceivably, a handle (not shown) could be connected to actuator 107 in a way that would cause an individual operating valve 100 to exert a "pushing" force that nonetheless results in "pulling" of piston 105 toward housing 113 and away from outlet 110, as described.

Figure 2:
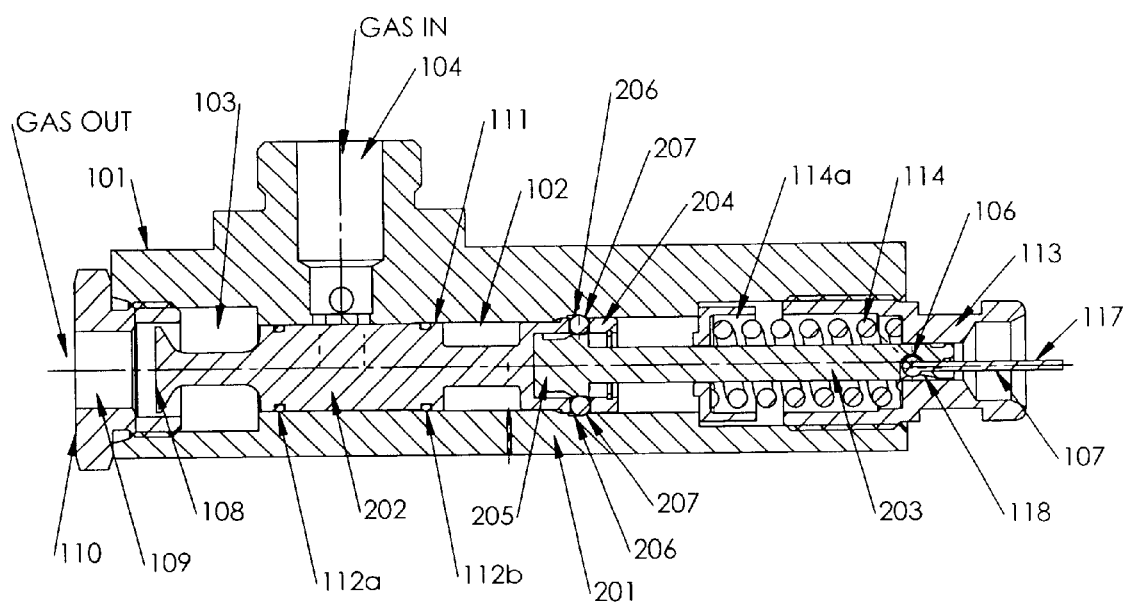
FIG. 2 is a cross-sectional view of a valve of the invention in its non-actuated position having a piston comprising two components and a positive lock mechanism.

FIG. 2 is a front cross-sectional view of a valve 200 in accordance with the present invention. Valve 200 differs from the previously described valve 100 in having a piston comprising two components and a positive lock mechanism.

However most of the elements of valve 100 are also contained for the same respective purposes in valve 200, including valve housing 101 having inner wall 102 and inner chamber 103, gas inlet bore 104, actuator connector 106, valve actuator 107, piston head 108, outlet bore 109 at gas outlet 110, gas seal land 111, O-ring seals 112a and 112b, actuator housing 113, regulating spring 114, washer 114a, cable or rod 117, and ball 118.

As shown in FIG. 2, valve 200 further includes a piston 201 that comprises two interconnecting components 202 and 203. First piston component 202 includes piston head 108, gas seal land 111, and O-ring seals 112a and 112b, while second piston component 203 includes actuator connector 106, valve actuator 107, regulating spring 114, washer 114a, cable or rod 117, and ball 118. Piston components 202 and 203 are interconnected by corresponding flanges 204 and 205, respectively. Piston component 203 further includes at its juncture with component 202 a positive lock mechanism comprising detents 206 that, in their non-actuated, i.e., locked position, are disposed in a groove 207 in inner wall 102 of valve housing 101. The elements and operation of the lock mechanism will be described with reference to FIGS. 3A and 3B.

Figure 3A:
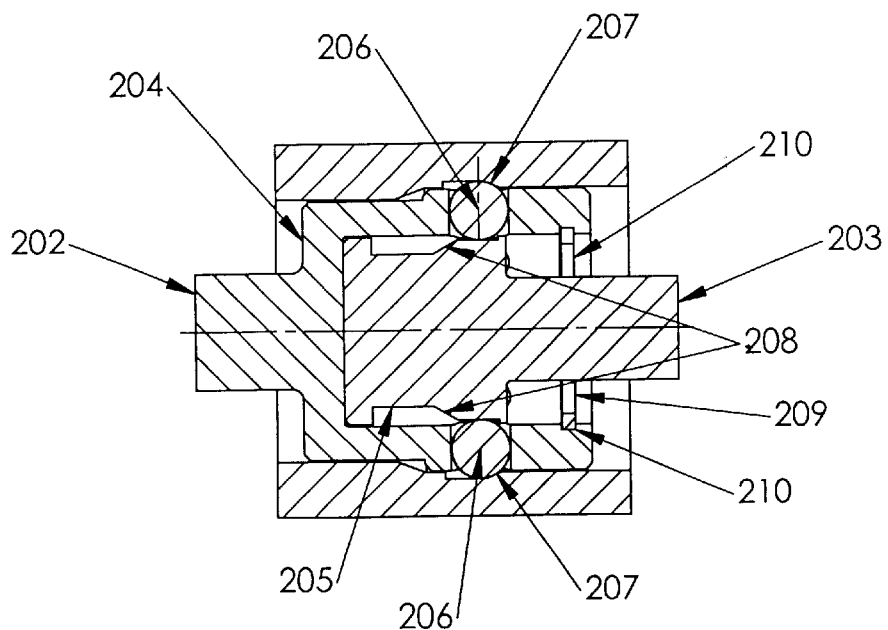
FIGS. 3A and 3B are cross-sectional views of the positive lock mechanism included in the valve depicted in FIG. 2 FIGS. 3A and 3B depict the lock mechanism in, respectively, its non-actuated (locked) and actuated (unlocked) positions.
Figure 3B:
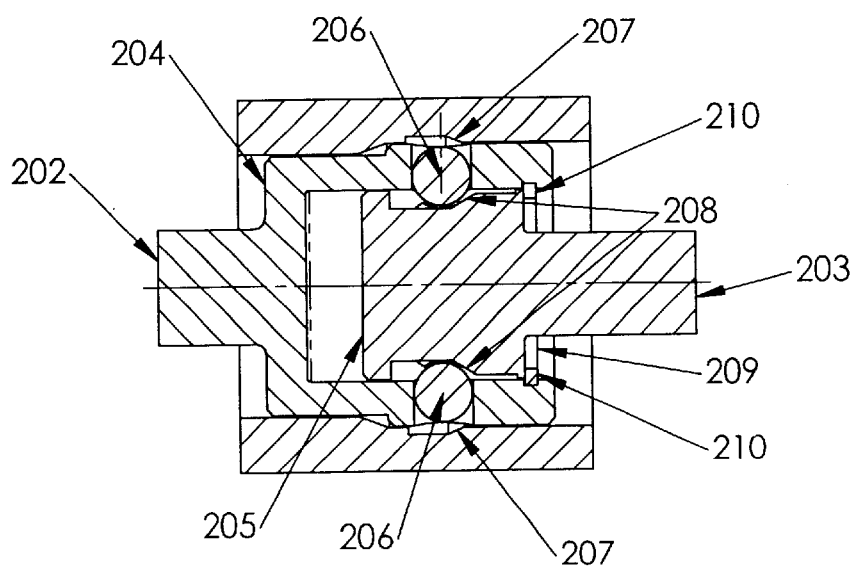

In FIG. 3A is shown the lock mechanism in its non-actuated, i.e., locked position, wherein detents 206 are held in place by piston second component 203 and thus prevent movement of piston first component 202. Pulling operation of valve actuator 107, which is connected to second component 203 as shown in FIG. 2, causes component 203 to move away from first component 202 and allows detents 206, which preferably have rounded surfaces and can be spherical in shape, to exit groove 207 and slide down ramps 208 of flange 205, as shown in FIG. 3B. In its actuated, unlocked position, second piston component 203 is free to move along with interconnected first component 202 as the pulling operation of actuator 107 is continued. A snap ring 209 can be inserted in an annular groove 210 in housing inner wall 102 to serve as a stop for the lateral motion of flange 205 when second piston component 203 is caused to move by the pulling operation of valve actuator 107.

Movement of interconnected components 202 and 203 of piston 201 results in unsealing of gas inlet bore 104, allowing gas to flow into the inner chamber 103 and thence to outlet 110. As described for valve 100, the force of the pressure on piston 205 of valve 200, which diminishes as the discharged gas exits outlet 110, is counteracted by a substantially equal opposing force from compressed spring 114, causing piston 205 to return towards its original non-actuated position as the gas pressure at inlet bore 104 decreases.

Thus, the inflation valve of the present invention is desirably simple in its construction and operation. The trigger mechanism is kept to a minimum, including at one end a cable or rod that pulls directly on the valve piston, which is held in its normal, inactuated position by O-rings and a safety lock mechanism. When the cable or rod is pulled, the pressure from the pressurized tank opens the valve, the flow of gas being regulated by the inlet pressure from the pressurized gas source and regulating spring at the end of the piston opposite the gas outlet to an inflatable device.

Having thus described the preferred embodiment of the invention, those skilled in the art will appreciate that various modifications and additions may be made thereto without departing from the spirit and scope of the invention, as set forth in the following claims.

What is claimed is:

1. A inflation valve comprising:
   a valve housing having an inner wall, a cylindrical inner chamber terminating in a gas outlet, and a gas inlet bore providing fluid communication between said inner chamber and a pressurized gas source;
   a piston enclosed in said inner chamber, said piston comprising at one end a head directed toward said gas outlet and at the opposite end a valve actuator connector, said piston further comprising a gas inlet seal positioned between said head and said actuator connector, said seal releasably sealing said gas inlet bore from said gas outlet when said piston is in a normal non-actuated position, said piston further comprising first and second interconnecting components, said first and second piston components being interconnected by corresponding flanges on said components;
   a valve actuator connected to said actuator connector, said actuator operating to pull said piston, thereby moving said gas inlet seal away from said gas inlet bore and putting said inner chamber in fluid communication with said gas inlet bore and said pressurized gas source, and
   at least one regulating spring confined within the portion of said inner chamber proximate said actuator connector, said spring being compressible by the force of pressure exerted by gas introduced through said gas inlet bore into said inner chamber when said valve actuator and actuator connector are actuated to pull said piston towards said spring, said piston returning towards its normal non-actuated position as gas contained within said inner chamber exits via said gas outlet.

2. The inflation valve of claim 1 wherein said first component comprises said piston head and said gas inlet seal, and said second component comprises said actuator connector, said connector being attached to said valve actuator.

3. The inflation valve of claim 2 wherein said second piston component further comprises a safety lock for preventing inadvertent actuation of said valve.

4. The inflation valve of claim 3 wherein said lock comprises detents disposed on said flange of said second piston component, said detents extending into notches in said inner wall of said housing when said lock is in a non-actuated, locked position.

5. The inflation valve of claim 4 wherein said flange of said second piston component further comprises ramps adjacent said detents, said detents, upon operating of said valve actuator, being caused to exit said notches in said housing inner wall and move down said ramps, thereby putting said lock in an actuated, unlocked position and enabling said interconnected components of said piston to move within said housing.

6. The inflation valve of claim 1 further comprising a snap ring disposed in an annular groove in said inner wall of said valve housing, said snap ring acting to stop lateral motion of said flange of said second piston component resulting from pulling operation of said valve actuator.

7. The inflation valve of claim 1 wherein said gas inlet seal comprises at least one O-ring seal disposed on said piston.

8. The inflation valve of claim 1 wherein said valve actuator comprises a rod or cable attached to said connector.

9. The inflation valve of claim 1 further comprising a safety lock for preventing inadvertent actuation of said valve.

10. The inflation valve of claim 1 wherein said cylindrical inner chamber includes a portion having a diameter larger than the diameter of said cylinder head, said portion being disposed between said gas inlet bore and said gas outlet.

* * * * *